Jan. 3, 1967 L. W. GERTSMA ETAL 3,295,556

FOLDABLE CONDUIT

Filed Aug. 26, 1963

INVENTORS
LAURENCE W. GERTSMA
BY JAMES H. DUNN

ATTORNEYS

United States Patent Office 3,295,556
Patented Jan. 3, 1967

3,295,556
FOLDABLE CONDUIT
Laurence W. Gertsma, Berea, and James H. Dunn, Lakewood, Ohio, assignors to the United States of America as represented by the Administrator of the National Aeronautics and Space Administration
Filed Aug. 26, 1963, Ser. No. 304,698
1 Claim. (Cl. 138—119)

The invention described herein may be manufactured and used by or for the Government of the United States of America for governmental purposes without the payment of any royalties thereon or therefor.

This invention relates generally to conduits and, more particularly, to a conduit which may be folded or bent without the walls thereof permanently deforming.

In order to achieve optimum efficiency in carrying capability and ease of storing of space vehicles at launch, it has been observed that it is desirable to retain as many components as possible within the confines of the space vehicle itself. There are many instances wherein items such as nuclear reactors, antennae, radiators and extensible legs for lunar landings must be projected or injected out into space after the vehicle has left the confines of the launching pad. Some of the techniques of confining an element to be subsequently erected when in orbit, or in other space flight paths, is the utilization of a coiled tube, for example, which is partially uncoiled for erection or utilization of a large bellows-type joint to provide for the flexibility of right angle curvature. Some of the disadvantages associated with such techniques are that the coiled tube becomes very large and heavy for 90° of movement, and the bellows is large and must be made of thin material if it is to be bent with a small force which thereby lowers the reliability with corrosive fluids. Also, the bellows will trap fluid in the folds and, further, the folds will cause large pressure drops in flowing fluids. Additionally, when one applies a bending force to the conventional tubular conduit the risk is always present that the conduit will collapse at the point of bending thus eliminating any spring or resilient force necessary to urge the conduit into the unbent position.

Accordingly, it is an object of this invention to provide a foldable conduit having the characteristic of springing back into a rigid position.

Another object of the instant invention is to provide a new and novel self-erecting structural member.

Still another object of this invention is to provide a new and improved method for making a nonpermanent-deforming-foldable-conduit.

A still further object of the present invention is the provision of a self-erecting foldable conduit.

According to the present invention, the foregoing and other objects are obtained by providing a conduit having a cross-sectional contour defined by opposing arcs of circles having substantially equal radii so that when flattened the contour will provide a fairly uniform stress at all points in the flattened position. To provide the aforementioned foldable conduit, two opposing elements of the conduit are formed; each one having three changes of curvilinear shape associated therewith comprised of the arcs of circles having substantially equal radii. The elements are fastened or secured at the ends thereof so that the curvilinear ends of the elements are in juxtaposition tangentially at the point of fastening.

A more complete appreciation of the invention and many of the attendant advantages thereof will be greatly appreciated as the same becomes better understood with reference to the following detailed description when considered in connection with the accompanying drawing wherein.

Figure 1:
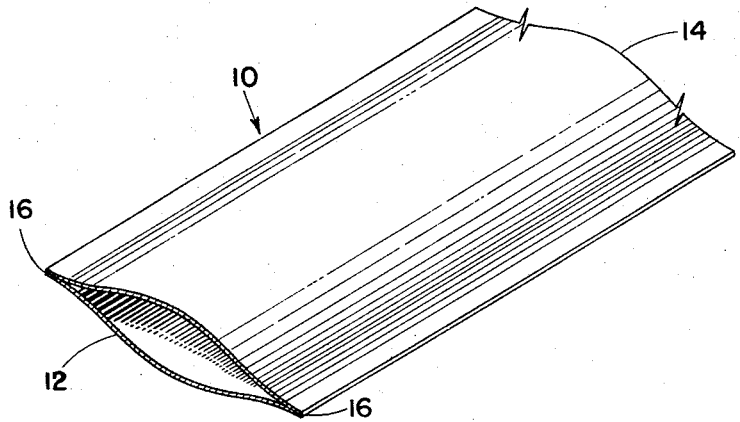
FIG. 1 is a perspective view illustrating a conduit made in accordance with this invention.
Figure 2:
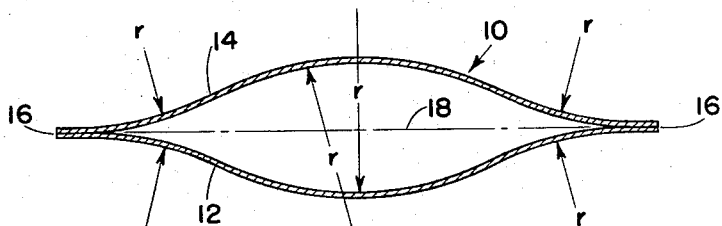
FIG. 2 is an end section of the conduit shown in FIG. 1.

Referring now to the drawings wherein like reference materials designate identical or corresponding parts throughout the several views and, more particularly, to FIGS. 1 and 2 wherein the foldable conduit 10 is shown as consisting of a first side 12 and a second side 14 fastened together at the ends 16. As better shown in FIG. 2, the first and second side has a curvilinear shape defined by opposing arcs having substantially equal radii $r$. Material chosen for the sides 12 and 14 and the thickness thereof should be with regard to a number of practical considerations taking into account the environment within which the conduit 10 is to be utilized and particularly that the sides be fabricated of a material having some degree of flexibility. A material having a characteristic of high yield strength has been found to be satisfactory. The sides 12 and 14 may be formed or stamped by any conventional method to provide a contour generally described as a middle arc continuing on each side thereof as substantially equal arcs tangentially and of an opposing direction thereof terminating as ends tangentially in the same plane 18; all arcs having substantially equal radii. The ends are secured by welding or any other conventional technique so that the ends of the opposing sides are parallel and in juxtaposition to each other. To provide for additional structural strength, the parts may be extended beyond the initial point of tangential contact parallel to the same plane 18.

Figure 3:
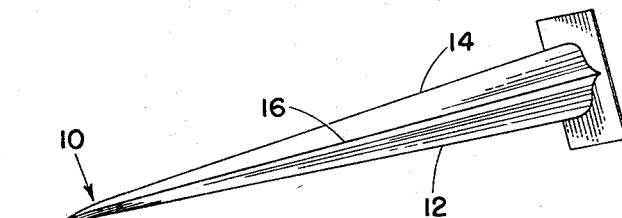
FIG. 3 is an elevation of the conduit of FIG. 1 shown in a collapsed and bent position.

In FIG. 3, the general shape of the conduit invention is shown when it is flexed in a partially folded position. In actual practice, it has been determined that a conduit constructed in accordance with the invention can be bent to a radius of curvature up to 1½ inches. Radius of curvature is defined as a radius of a circle about which a tube can be wrapped. Upon removal of the stress causing retention (not shown) of the conduit in the position shown in FIG. 3, the conduit will immediately straighten and become a light, strongly rigid structural member. Because of the smooth inner surface, any pressure drop associated with the flowing of fluid through the conduit is negligible. Simplicity of the invention increases the reliability of structural integrity when cycling the conduit through the stress-unstress positions as exemplified by the fact that an invention constructed in accordance with the teachings herein has been flexed over a hundred times with no apparent structural deterioration.

Quite obviously, applicants' invention can be utilized in all applications wherever tubular members have to be folded for one purpose or another. In addition to enabling compact foldable construction of radiators for space power systems, the foldable conduit or tube concept can be employed as rigid legs of nonsurface to surface vehicles for landing purposes which legs are coiled up within the vehicle itself and deployed before settling down on a surface.

Another application for the foldable tube exists when a space propulsion system is powered by a nuclear reactor. For example, one end of each of two tubes would be rigidly attached to the vehicle structure and the other ends attached to the reactor. The reactor would then be rolled in the collapsed tubes and secured in the vehicle for launch. Prior to system startup, the reactor would be deployed out in front and away from the vehicle by unrolling the reactor and tubes. Positioning the reactor out in front of the vehicle would reduce the required area of reactor shadow shield. The expanded tubes would carry the reactor coolant to and from the vehicle.

Obviously, numerous other modifications and variations of the present invention are possible in the light of the above teachings.

It is, therefore, to be understood that within the scope of the appended claim, the invention may be practiced otherwise than as specifically described herein.

What is claimed is:

In a bendable tubular support of the type having two flexible parts with mating marginal surface portions of each joined to the other along the length thereof and central sections traversely bowed outwardly from the plane of the marginal surface portions, the improvement comprising,

- an inwardly curved portion between each of the central sections and the marginal surface portions,
- one edge of said inwardly curved portion being tangent to the central section to provide a smooth, gradual, reversal of curvature whereby high stress concentrations are prevented when said central sections are forced towards one another,
- the opposite edge of said inwardly curved portion being tangent to the marginal surface portion whereby said inwardly curved portion merges smoothly with said marginal surface portion thereby preventing high stress areas between said inwardly curved portion and said marginal portion when said support is bent,
- the radius of each inwardly curved portion being substantially equal to the radius of the traverse bow in the central section so that stresses in the flexible parts are equalized to prevent kinking or rupture of the support when it is bent sharply.

References Cited by the Examiner

UNITED STATES PATENTS 3,032,151    5/1962    Allen et al. _ _ _ _ _ _    138—119 X LAVERNE D. GEIGER, *Primary Examiner.*

T. MOORHEAD, *Examiner.*